United States Patent [19]

Mizumura et al.

[11] 4,152,485
[45] May 1, 1979

[54] MAGNETIC RECORDING MEDIUM

[75] Inventors: Yutaka Mizumura, Shiga; Nobuyuki Hiura; Hideo Miyake, both of Otsu, all of Japan

[73] Assignee: Toyo Boseki Kabushiki Kaisha, Japan

[21] Appl. No.: 928,338

[22] Filed: Jul. 27, 1978

[30] Foreign Application Priority Data

Aug. 5, 1977 [JP] Japan .................................. 52-94430
Jun. 1, 1978 [JP] Japan .................................. 53-66459

[51] Int. Cl.$^2$ .......................... H01F 1/26; B32B 27/40
[52] U.S. Cl. ................................ 428/425; 252/62.54; 427/128; 428/64; 428/65; 428/480; 428/900
[58] Field of Search .................... 428/425, 900, 64, 65, 428/480, 411; 360/134, 135; 427/128, 127; 252/62.54

[56] References Cited

U.S. PATENT DOCUMENTS

| | | | |
|---|---|---|---|
| 3,281,344 | 10/1966 | Thomas | 252/62.54 |
| 3,763,079 | 10/1973 | Fryd | 428/900 |
| 3,804,810 | 4/1974 | Fryd | 428/900 |
| 3,955,037 | 5/1976 | Marx | 252/62.54 |
| 4,000,336 | 12/1976 | Hartmann | 428/900 |
| 4,018,691 | 4/1977 | Neal | 252/62.54 |
| 4,068,040 | 1/1978 | Yamada | 428/900 |
| 4,073,777 | 2/1978 | O'Neill | 428/480 |

*Primary Examiner*—Ellis Robinson
*Attorney, Agent, or Firm*—Jones, Tullar & Cooper

[57] ABSTRACT

A magnetic recording medium having a high ratio of the residual magnetization (Br) to the saturation magnetization (Bm) and decreased voids, which has a magnetizable layer of magnetic particles which are dispersed in a binder: a polyester or polyurethane having a metal sulfonate group of 10 to 1,000 equivalents/$10^6$ g of the polymer, preferably a polyester having a reduced viscosity of 0.2 or more and having a metal sulfonate group of 20 to 300 equivalents/$10^6$ g of the polyester; a polyester having a reduced viscosity of less than 0.2 and having a metal sulfonate group of 20 to 500 equivalents/$10^6$ g of the polyester; or a polyurethane having a metal sulfonate group of 20 to 400 equivalents/$10^6$ g of the polyurethane. Said magnetic recording medium is particularly suitable for an electronic computer tape and video tape.

12 Claims, No Drawings

MAGNETIC RECORDING MEDIUM

The present invention relates to a magnetic recording medium, more particularly to a tape- or sheet-like, flexible magnetic recording medium having a magnetizable layer of fine magnetic particles which are dispersed in a binder.

As a binder for a magnetic recording medium, there have been used various materials, such as ethyl cellulose, nitrocellulose, polyvinylidene chloride, vinyl chloride-vinyl acetate copolymer, styrene-butadiene copolymer, butadiene-acrylonitrile copolymer, polymethyl methacrylate, vinylidene chloride-methyl methacrylate copolymer, polyurethane, epoxy resin, polyester, or the like. However, these materials are not sufficiently suitable for the preparation of magnetic recording medium such as an electronic computer and video tape which requires high performances. When a magnetic tape is prepared by using as a magnetizable material $\gamma$-$Fe_2O_3$ particles having a spinel structure and the above binder, the tape has a ratio (Br/Bm) of the residual magnetisation (Br) to the saturation magnetisation (Bm) of 0.5 to 0.7 and voids of 0.4 to 0.5. It has been required to obtain a magnetic tape having a higher Br/Bm ratio and a lower voids.

It is known that when a ferromagnetic $CrO_2$ modified with tellurium is used together with a linear polyester of isophthalic acid-1,4-butanediol (polycondensation product) as a binder, the ratio of Br/Bm is increased to 0.7 to 0.9 (cf. Japanese Patent Publication Nos. 12422/1972 and 18573/1972). In order to obtain a magnetic tape or sheet having excellent performances, mere increase of the ratio of Br/Bm is not sufficient, but the magnetic tape or sheet should have also high filling characteristics, i.e. low voids.

As a result of the present inventor's experiment, it has been found that a magnetic tape prepared from the conventional $\gamma$-$Fe_2O_3$ and the conventional linear polyester has voids of 0.38 to 0.45 and hence is not satisfactory. It is possible to decrease the voids by prolonging the kneading time, but it results in decrease of sensitivity of the magnetic tape because the fine particles of $\gamma$-$Fe_2O_3$ are made more fine.

Under the circumstances, the present inventors have intensively studied on the development of an improved magnetic tape having an increased ratio of Br/Bm and decreased voids, while the conventional $\gamma$-$Fe_2O_3$ and $CrO_2$ are used as the magnetic particles. As the result, it has been found that when a polyester or polyurethane copolymerized with a metal sulfonate-containing component is used as a binder, the resulting magnetic tape shows an extremely high ratio of Br/Bm and low voids.

An object of the present invention is to provide an improved magnetic recording medium having a high ratio of Br/Bm and low voids, while using the conventional $\gamma$-$Fe_2O_3$ and $CrO_2$ particles.

Another object of the invention is to provide a binder suitable for preparing a magnetic recording medium having excellent performances, i.e. a high ratio of Br/Bm and low voids.

A further object of the invention is to use a a polyester or polyurethane copolymerized with a metal sulfonate-containing component as a binder for preparing a magnetic recording medium.

These and other objects and advantages of the present invention will be apparent from the following description.

The magnetic recording medium of the present invention has a magnetizable layer which is formed by dispersing the magnetic fine particles into a polyester or polyurethane resin having a metal sulfonate group of 10 to 1,000 equivalents/$10^6$ g of the polymer.

When the polymer has a metal sulfonate group of less than 10 equivalent/$10^6$ g of the polymer, the ratio of Br/Bm is not increased and the filling characterestics are not improved, either. On the other hand, when the content of the metal sulfonate group is more than 1,000 equivalents/$10^6$ g of the polymer, the polymer shows inferior solubility in a solvent and hence is not suitable as a binder.

In case using a polyester containing the metal sulfonate group in the specific amount, it has a further advantage that a high concentration of the magnetic particles can be incorporated into the polyester and hence can form a magnetizable layer having higher performances.

The content of metal sulfonate group in the polyester may also be shown by the amount of the starting material. That is, the polyester used in the present invention may preferably be prepared by using a dicarboxylic acid component having a metal sulfonate group of 0.3 to 7.0% by mol based on the total carboxylic acid components.

The polyester used in the present invention is prepared by copolymerizing carboxylic acid components including a dicarboxylic acid component having a metal sulfonate group of 0.3 to 7.0% by mol based on the total carboxylic acid components and glycol components.

The carboxylic acid components include aromatic dicarboxylic acids (e.g. terephthalic acid, isophthalic acid, orthophthalic acid, 1,4-, 2,5-, 2,6-naphthalic acid, biphenyl dicarboxylic acid), aromatic oxycarboxylic acids (e.g. p-hydroxybenzoic acid, p-(hydroxyethoxy)-benzoic acid), aliphatic dicarboxylic acids (e.g. succinic acid, adipic acid, azelaic acid, sebacic acid, dodecanedicarboxylic acid), or the like. It is preferable to use at least one aromatic carboxylic acid and at least one aliphatic dicarboxylic acid in a ratio of 50/50 to 100/0 by mol (aromatic carboxylic acid/aliphatic dicarboxylic acid), wherein the aromatic carboxylic acid component contains at least 30% by mol of terephthalic acid. A small amount of a tri- or tetra-carboxylic acid (e.g. trimellitic acid, trimesic acid, pyromellitic acid) may be used together.

The glycol components used for the preparation of the polyester include ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, ethylene oxide and/or propylene oxide adduct of bisphenol A, ethylene oxide and/or propylene oxide adduct of hydrogenated bisphenol A, polyethylene glycol, polypropylene glycol, polytetramethylene glycol, or the like. A small amount of a triol or tetraol (e.g. trimethylolethane, trimethylolpropane, glycerine, pentaerythritol) may be used together.

The dicarboxylic acid component having a metal sulfonate group include metal salts of 4-sulfophthalic acid, 5-sulfoisophthalic acid, sulfoterephthalic acid, 4-sulfonaphthalene-2,7-dicarboxylic acid, 5-(4-sulfophenoxy)isophthalic acid, 5-(4-sulfophenoxy)terephthalic acid, or the like. The preferable dicarboxylic acid components having a metal sulfonate group are alkali metal salts of the above-mentioned sulfodicarboxylic acids and more preferable dicarboxylic acid components are 5-sodium sulfoisophthalic acid, 5-potassium sulfoisophthalic acid, sodium sulfoterephthalic acid, and potassium sulfoterephthalic acid. The dicarboxylic acid component having a metal sulfonate group may preferably be copolymerized in 0.3 to 7.0% by mol, more preferably 1.0 to 5.0% by mol, based on the total carboxylic acid components.

The polyester containing a metal sulfonate of the present invention has preferably a reduced viscosity of 0.2 or more. When the polyester has a reduced viscosity of less than 0.2, it is preferable to use the polyester in a combination of other thermoplastic resins and/or thermosetting resins, and in this case, the dicarboxylic acid components having a metal sulfonate group may be copolymerized in 0.5% by mol or more, preferably 1.0 to 50% by mol, based on the total carboxylic acid components.

The other thermoplastic resins and thermosetting resins mentioned above include vinyl chloride-vinyl acetate copolymer, vinyl chloride-vinylidene chloride copolymer, vinyl chloride-acrylonitrile copolymer, acrylic acid ester-vinylidene chloride copolymer, acrylic acid ester-styrene copolymer, methacrylic acid-acrylonitrile copolymer, methacrylic acid ester-vinylidene chloride copolymer, methacrylic acid ester-styrene copolymer, polyvinyl fluoride, vinylidene chloride-acrylonitrile copolymer, butadiene-acrylonitrile copolymer, styrene-butadiene copolymer, chlorovinyl ether-acrylic acid ester copolymer, polyvinyl butyral, cellulose derivatives (e.g. cellulose acetate butyrate, cellulose propionate, nitrocellulose, etc.), polyamide, polyester other than the above polyester, amino resin, phenol resin, polyurethane, epoxy resin, alkyd resin, silicone resin, or the like. The polyester having a reduced viscosity of less than 0.2 may be mixed with the thermoplastic resins and/or thermosetting resins in an amount of 5 to 200 parts by weight per 100 parts by weight of the other thermoplastic or thermosetting resins.

The polyurethane used in the present invention is prepared by reacting a polyhydroxy compound and a polyisocyanate, wherein a part or whole of the polyhydroxy compound has a metal sulfonate group.

Partucularly suitable example of the polyhydroxy compound having a metal sulfonate group is a polyester polyol having a metal sulfonate group which comprises a carboxylic acid component having no metal sulfonate group, a glycol component and a dicarboxylic acid component having a metal sulfonate group.

The carboxylic acid component having no metal sulfonate group includes aromatic dicarboxylic acids, aromatic oxycarboxylic acids, aliphatic dicarboxylic acids and tri- and tetra-carboxylic acids as mentioned hereinbefore.

The glycol components used for the preparation of the polyurethane include the same glycol components as mentioned hereinbefore for the preparation of the polyester. The dicarboxylic acid components having a metal sulfonate group include also the same compounds as mentioned hereinbefore, and it may be copolymerized in an amount of 0.5% by mol, preferably 1 to 50% by mol, based on the total carboxylic acid components.

One or more of the polyhydroxy compound having a metal sulfonate group may be used and they may be used together with other polyhydroxy compounds having no metal sulfonate group, such as polyester polyols, polyether polyols, polyacryl polyols, derivatives of castor oil, derivatives of tall oil, and the like.

The polyisocyanates used for the preparation of the polyurethane include 2,4-tolylenediisocyanate, 2,6-tolylenediisocyanate, p-phenylenediisocyanate, diphenylmethanediisocyanate, m-phenylenediisocyanate, hexamethylenediisocyanate, tetramethylenediisocyanate, 3,3'-dimethoxy-4,4'-biphenylenediisocyanate, 2,4-naphthalenediisocyanate, 3,3'-dimethyl-4,4'-biphenylenediisocyanate, 4,4'-diphenylenediisocyanate, 4,4'-diisocyanate-diphenyl ether, 1,5-naphthalenediisocyanate, p-xylylenediisocyanate, m-xylylenediisocyanate, 1,3-diisocyanate-methylcyclohexane, 1,4-diisocyanatemethylcyclohexane, 4,4'-diisocyanate-dicyclohexane, 4,4'-diisocyanate-dicyclohexylmethane, isophorone-diisocyanate, and the like. A small amount of 2,4,4'-triisocyanate-diphenyl, benzene-triisocyanate, or the like may optionally be used together.

The polyurethane can be prepared by reacting a polyhydroxy compound and a polyisocyanate in a solvent or without using a solvent by a conventional method. Preferred ratio of the polyhydroxy compound and the polyisocyanate is in a range of 0.5-2:1 (NCO group of the polyisocyanate:OH group of the polyhydroxy compound). The polyurethane may preferably have an average molecular weight of 8,000 to 100,000.

The magnetic fine particles used in the present invention include $\gamma$-$Fe_2O_3$ having a spinel structure, cobalt-containing $\gamma$-$Fe_2O_3$, $Fe_3O_4$, cobalt-containing $Fe_3O_4$, $CrO_2$, cobalt-ferrite (CoO $Fe_2O_3$), cobalt-adsorbed iron oxide, ferromagnetic Fe-Co-Ni alloy, Co-Ni-Fe-B alloy, Fe-Ni-Zn alloy, Fe-Mn-Zn alloy, Co-Ni alloy, Co-Ni-P alloy, Fe-Co-Ni-P alloy, and the like.

When the polyester and polyurethane and other thermoplastic or thermosetting resins have a low softening point, there are dangers that the magnetizable layer is softened owing to the heat generated by the friction between the tape and the head or the blocking occurs while the tape is wound. In order to prevent such undesirable phenomena, it is preferable to incorporate a compound which is compatible and can react with the polyester or polyurethane to form a crosslinkage, unless the dispersibility of the magnetic fine particles is deteriorated. The compound may be incorporated in an amount of 2 to 100 parts by weight per 100 parts by weight of the polyester, the polyurethane or the resin mixture.

The compounds which can form a crosslinkage by reacting with the polyester or polyurethane include epoxy resins, isocyanate compounds, melamine resins, urea resins, polyol compounds, or the like. Among them, isocyanate compounds are particularly preferable.

The magnetic recording medium of the present invention may optionally be incorporated with other additives, such as plasticizers (e.g. dibutyl phthalate, triphenyl phosphate), lubricants (e.g. dioctylsulfosodium succinate, t-butylphenolpolyethylene ether, sodium ethylnaphthalenesulfonate, dilauryl succinate, zinc stearate, soy bean lecithin, silicone oil), dispersing agents, antistatic agents (e.g. carbon), or the like.

The polyester and polyurethane of the present invention may optinally be used together with other conventional binders, such as ethyl cellulose, nitrocellulose, polyvinylidene chloride, vinyl chloride-vinyl acetate copolymer, styrene-butadiene copolymer, polymethyl methacrylate, vinylidene chloride-methyl methacrylate copolymer, polyurethane, epoxy resin, polyester, or the like as mentioned hereinbefore. Moreover, the magnetizable layer of the present invention wherein the polyester or polyurethane of the present invention is used as a binder may be formed in a combination with undercoating layer and/or top coating layer.

Suitable ranges of the content of a metal sulfonate group in the polymer of the present invention are 20 to 300 equivalents/$10^6$ g of the polymer in case of a polyester having a reduced viscosity of 0.2 or more, 20 to 500 equivalents/$10^6$ g of the polymer in case of a polyester having a reduced viscosity of less than 0.2, and 20 to 400 equivalents/$10^6$ g of the polymer in case of a polyurethane.

According to the present invention, magnetic fine particles are dispersed into a solution of the polyester or polyurethane having a metal sulfonate group as mentioned hereinbefore in an appropriate solvent (e.g. methyl ethyl ketone, methyl isobutyl ketone, benzene, toluene, xylene, n-butyl alcohol, cellosolves, etc.) by conventional methods, for instance, by mixing with a ball mill, wherein other various additives as mentioned hereinbefore may be incorporated. The dispersion of the magnetic particles in a binder is then applied to a film or sheet of a base material for recording medium (e.g. polyethylene terephthalate film, polypropylene film, cellulose acetate film, etc.) in a conventional manner, and then the coated film or sheet is dried to remove the solvent and further heated to cure the coating layer, and thereby, the desired magnetizable layer having an increased Br/Bm ratio and decreased voids is formed on the base film or sheet.

When the polyester having a reduced viscosity of 0.2 or more of the invention is used as a binder, the obtained magnetic tape has a ratio of Br/Bm of 0.81-0.90 and voids of 0.22-0.35, when the polyester having a reduced viscosity of less than 0.2 is used together with other thermoplastic and/or thermosetting resins, the obtained magnetic tape has a ratio of Br/Bm of 0.78-0.90 and voids of 0.25-0.38, and when a polyurethane of the invention is used, the magnetic tape has a ratio of Br/Bm of 0.80-0.90 and voids of 0.20-0.34. Besides, the polyester having a metal sulfonate group and the polyurethane having a metal sulfonate group of the present invention may be used alone or both may be used together.

The magnetic recording medium of the present invention is useful for various magnetic recording products, such as electronic computer tapes, video tapes, audio tapes, magnetic tickets, magnetic cards, etc.

The present invention is illustrated by the following Examples but is not limited thereto. In Examples, "part" is shown by weight, unless specified otherwise. Besides, various properties were measured as follows:

(1) Reduced viscosity:

In case of polyester, the reduced viscosity $[\eta sp/c(dl/g)]$ was measured in a solution of a polyester resin (0.10 g) in a mixed solvent (25 ml) of phenol/tetrachloroethane (6/4 by volume) at 30° C.

In case of polyester polyol, the reduced viscosity $[\beta sp/c(dl/g)]$ was measured in a solution of a polyester polyol (0.10 g) in chloroform (25 ml) at 30° C.

(2) Softening point:

It was measured in accordance with the method as defined in JIS K 2351.

(3) Hydroxy value of polyester polyol:

It was measured by a back titration method with an alkali wherein pyridine is used as the solvent and acetic anhydride is used as the acetylating agent.

(4) Voids:

The voids were measured by the following formula:

$$\text{Voids} = \frac{(\text{measured specific volume}) - (\text{true specific volume})}{(\text{measured specific volume})} \times 100$$

The measured specific volume was measured by dipping the magnetizable layer into water. The true specific volume was calculated from the specific volume of each component contained in the magnetizable layer in accordance with the following formula:

$$\text{True specific volumed} = \frac{\Sigma(\omega i/\rho i)}{\Sigma \omega i}$$

wherein $\omega i$ is the weight of the component (i), and $\rho i$ is a density of the component (i).

(5) Smoothness of the magnetizable layer:

It was evaluated by naked eye.

PREPARATION (1) OF POLYESTER

To a reactor provided with a thermometer, a stirrer and a partial reflux condensor were added dimethyl terephthalate (175 parts), dimethyl isophthalate (78 parts), ethylene glycol (161 parts), neopentyl glycol (145 parts), dimethyl 5-sodium sulfoisophthalate (14.8 parts), zinc acetate (0.17 part), sodium acetate (0.02 part) and antimony trioxide (0.16 part), and the mixture was subjected to an ester exchange reaction at 140°-220° C. for three hours. Sebacic acid (131 parts) was added thereto and the mixture was further reacted at 210°-250° C. for one hour. After the reaction, the pressure of the reaction system was reduced to 1-5 mmHg during 60 minutes. The mixture was polycondensated at 250° C., under a reduced pressure of 0.1-0.3 mmHg for 60 minutes. The polyester (A) thus obtained had a reduced viscosity $\eta sp/c = 0.63$, a softening point of 113° C. and was faint yellow and transparent. According to NMR analysis, it had the following components:

| | | |
|---|---|---|
| Terephthalic acid | 45 | % by mol |
| Isophthalic acid | 20 | " |
| Sebacic acid | 32.5 | " |
| 5-Sodium sulfoisophthalic acid | 2.5 | " |
| Ethylene glycol | 50 | " |
| Neopentyl glycol | 50 | " |

In the same manner as described above, various polyesters (B) to (J) as shown in Table 1 were prepared.

Table 1

| Components | Polyesters | | | | | | | | | | |
| | A | B | C | D | E | F | G | H | I | J[*3] | K[*4] |
|---|---|---|---|---|---|---|---|---|---|---|---|
| Dicarboxylic acid: | | | | | | | | | | | |
| Terephthalic acid | 45 | 50 | 31 | 60 | 51 | 38 | 62 | 50 | 38 | 45 | |
| Isophthalic acid | 20 | 48 | 29 | | 47 | 42 | | 49 | 32 | 20 | |
| Adipic acid | | | 37 | | | | | | 26 | | |
| Sebacic acid | 32.5 | | | 38.5 | | 16.5 | 35.5 | | | 35 | |
| DSN[*1] | 2.5 | 2 | 3 | 1.5 | 2 | 3.5 | 2.5 | 1 | 4 | | |

Table 1-continued

| Components | Polyesters | | | | | | | | | | |
|---|---|---|---|---|---|---|---|---|---|---|---|
| | A | B | C | D | E | F | G | H | I | J[*3] | K[*4] |
| Glycol: | | | | | | | | | | | |
| Ethylene glycol | 50 | 61 | 58 | 60 | | 61 | 51 | 61 | 44 | 51 | |
| 1,4-Butanediol | | | | | 41 | | | | | | |
| 1,5-Pentanediol | | 39 | | | | | | | | | |
| Neopentyl glycol | 50 | | 42 | 40 | 59 | | | 39 | | 49 | |
| Diethylene glycol | | | | | | 39 | | | | | |
| BPA-2EO[*2] | | | | | | | 49 | | 56 | | |
| Properties: | | | | | | | | | | | |
| ηsp/c | 0.63 | 0.52 | 0.58 | 0.63 | 0.36 | 0.58 | 0.46 | 0.52 | 0.28 | 0.61 | |
| Softening point (° C.) | 113 | 125 | 110 | 113 | 127 | 90 | 125 | 160 | 105 | 108 | 165 |

[Remarks]:
[*1]5-Sodium sulfoisophthalic acid
[*2]2,2-Bis[4-(2-hydroxyethoxy)phenyl]propane
[*3]Reference example
[*4]Reference example: vinyl chloride-vinyl acetate copolymer (Tradename: VAGH, made by Union Carbide Corp.)

PREPARATION (2) OF POLYESTER

To a reactor provided with a thermometer, a stirrer and a partial reflux condensor were added dimethyl terephthalate (155 parts), dimethyl isophthalate (155 parts), ethylene glycol (150 parts), neopentyl glycol (166 parts), polyethylene glycol ($\overline{MW}$=2000, 80 parts), dimethyl 5-sodium sulfoisophthalate (17.5 parts), zinc acetate (0.13 part), antimony trioxide (0.30 part) and sodium acetate (0.01 part), and the mixture was subjected to an ester exchange reaction at 140°–220° C. for 3 hours. Adipic acid (49 parts) and triphenyl phosphite (0.38 part) were further added, and the mixture was reacted at 210°–250° C. for one hour. After the reaction, the pressure of the reaction system was reduced to 1–5 mmHg during 60 minutes. The mixture was subjected to polycondensation at 250° C. under a reduced pressure of 0.1–0.3 mmHg for 60 minutes. The resulting polyester (L) had ηsp/c of 0.56 and a softening point of 110° C. and was faint green and transparent. According to NMR analysis, it had the following components:

| | | |
|---|---|---|
| Terephtalic acid | 40 | % by mol |
| Isophthalic acid | 40 | " |
| Adipic acid | 17 | " |
| 5-Sodium sulfoisophthalic acid | 3 | " |
| Ethylene glycol | 44 | % by mol |
| Neopentyl glycol | 54 | " |
| Polyethylene glycol | 2 | " |

PREPARATION (3) OF POLYESTER

To a reactor provided with a thremometer, a stirrer and a partial reflux condensor were added dimethyl terephthalate (582 parts), dimethyl 5-sodium sulfoisophthalate (296 parts), ethylene glycol (434 parts), neopentyl glycol (728 parts), zinc acetate (0.66 part) and sodium acetate (0.08 part) and the mixture was subjected to an ester exchange reaction at 140°–220° C. for three hours. Sebacic acid (1212 parts) was added and the mixture was reacted at 210°–250° C. for two hours. After the reaction, the pressure of the reaction system was reduced to 20 mmHg during 30 minutes, and the mixture was polycondensated at 250° C. under a reduced pressure of 5–20 mmHg for 50 minutes. The polyester (M) had a reduced viscosity of 0.182. According to NMR analysis, it had the following components:

| | | |
|---|---|---|
| Terephthalic acid | 30 | % by mol |
| 5-Sodium sulfoisophthalic acid | 10 | " |
| Sebacic acid | 60 | " |
| Ethylene glycol | 44 | " |
| Neopentyl glycol | 56 | " |

In the same manner as described above, various polyesters (N) to (S) as shown in Table 2 were prepared.

Table 2

| Components | Polyesters | | | | | | |
|---|---|---|---|---|---|---|---|
| | M | N | O | P | Q[*4] | R[*4] | S[*4] |
| dicarboxylic acid: | | | | | | | |
| Terephthalic acid | 30 | 30 | | | 35 | 30 | 50 |
| Isophthalic acid | | 20 | | 20 | | | 20 |
| Apipic acid | | | 35 | | | | 30 |
| Sabacic acid | 60 | | 70 | 40 | 65 | 55 | |
| DSN[*1] | 10 | 15 | 30 | 40 | | 15 | |
| Glycol: | | | | | | | |
| Ethylene glycol | 44 | | 45 | | 45 | 44 | 50 |
| 1,5-Pentanediol | | 55 | | | | | |
| Neopentyl glycol | 56 | | | 40 | 55 | 56 | 50 |
| Diethylene glycol | | | | 60 | | | |
| 1,4-Butanediol | | 43 | | | | | |
| Polyethylene glycol[*2] | | 2 | | | | | |
| BPA-2EO[*3] | | | | 55 | | | |
| Properties: | | | | | | | |

Table 2-continued

| Components | Polyesters | | | | | | |
|---|---|---|---|---|---|---|---|
| | M | N | O | P | Q*4 | R*4 | S*4 |
| ηsp/c | 0.182 | 0.154 | 0.092 | 0.085 | 0.175 | 0.465 | 0.620 |

[Remarks]:
*1 5-Sodium sulfoisophthalic acid
*2 $\overline{MW}$ = 1000
*3 2,2-Bis-[4-(2-hydroxyethoxy)phenyl]propane
*4 Reference examples

PREPARATION OF POLYESTER POLYOLS

To a reactor provided with a thermometer, a stirrer and a partial reflux condensor were added dimethyl terephthalate (582 parts), dimethyl 5-sodium sulfoisophthalate (296 parts), ethylene glycol (434 parts), neopentyl glycol (728 parts), zinc acetate (0.66 part) and sodium acetate (0.08 part) and the mixture was subjected to an ester exchange reaction at 140°-220° C. for three hours. Sebacic acid (1212 parts) was added thereto, and the mixture was reacted at 210°-250° C. for two hours. After the reaction, the pressure of the reaction system was reduced to 20 mmHg during 30 minutes, and the mixture was further polycondensated at 250° C. under a reduced pressure of 5-20 mmHg for 50 minutes. The polyester polyol (a) thus obtained had ηsp/c of 0.182 and a hydroxyl value of 38. According to NMR analysis, it had the following components:

Terephthalic acid: 30% by mol, 5-sodium sulfoisophthalic acid: 10% by mol, sebacic acid: 60% by mol, ethylene glycol: 44% by mol, neopentyl glycol: 56% by mol.

In the same manner as described above, various polyester polyols (b) to (g) as shown in Table 3 were prepared.

Table 3

| Components | Polyester polyols | | | | | | |
|---|---|---|---|---|---|---|---|
| | a | b | c | d | e | f | g |
| Dicarboxylic acid: | | | | | | | |
| Terephthalic acid | 30 | | | 35 | | 30 | |
| Isophthalic acid | | | 40 | | | 20 | 30 |
| Adipic acid | | 80 | 48 | 60 | | 50 | |
| Sebacic acid | 60 | | | | 70 | | 70 |
| DSN*1 | 10 | 20 | 12 | 5 | 30 | | |
| Glycol: | | | | | | | |
| Ethylene glycol | 44 | 67 | | 50 | 100 | 65 | 95 |
| 1,4-Butanediol | | | 55 | | | | |
| 1,5-Pentanediol | | 33 | | | | 35 | |
| Neopentyl glycol | 56 | | | 45 | | | |
| Polyethylene glycol ($\overline{MW}$ = 1000) | | | | 5 | | | 5 |
| BPA-2EO*2 | | | 45 | | | | |
| Properties: | | | | | | | |
| ηsp/c | 0.182 | 0.130 | 0.206 | 0.261 | 0.093 | 0.302 | 0.220 |
| hydroxyl value | 38 | 49 | 31 | 28 | 73 | 22 | 35 |

*1 5-Sodium sulfoisophthalic acid
*2 2,2-Bis[4-(2-hydroxyethoxy)phenyl]-propane

PREPARATION OF POLYURETHANE

To a reactor provided with a thermometer, a stirrer and a reflux condenser were added toluene (1280 parts), methyl isobutyl ketone (850 parts), polyester polyol (a) (1000 parts), diphenylmethane-diisocyanate (71 parts) and dibutyl-tin dilaurate (1.2 parts) and the mixture was reacted at 70°-90° C. for 8 hours. The polyurethane (I) thus obtained had a metal sulfonate group of 378 equivalents/$10^6$ g and a molecular weight of 18,000.

In the same manner as described above, various polyurethane (II) to (VIII) as shown in Table 4 were prepared.

Table 4

| Starting materials (Parts by weight) | Polyurethanes | | | | | | | |
|---|---|---|---|---|---|---|---|---|
| | I | II | III | IV | V | VI | VII* | VIII* |
| Polyester polyol: | | | | | | | | |
| a | 1000 | | | | | 200 | 10 | |
| b | | 400 | | | | | | |
| c | | | 500 | | | | | |
| d | | | | 1000 | | | | |
| e | | | | | 250 | | | |
| f | | 600 | | | 750 | | 990 | |
| g | | | 500 | | | 800 | | 1000 |
| Polyisocyanate: | | | | | | | | |
| Diphenylmethane-diisocyanate | 71 | | | | 73 | | 45 | |
| Hexamethylene-diisocyanate | | | 49 | | | | | |
| 2,4-Tolylene-diisocyanate | | 40 | | | | 47 | | 42 |
| p-Xylylene- | | | | | | | | |

Table 4-continued

| Starting materials | Polyurethanes | | | | | | | |
|---|---|---|---|---|---|---|---|---|
| (Parts by weight) | I | II | III | IV | V | VI | VII* | VIII* |
| diisocyanate | | | | 42 | | | | |
| Ratio of NCO/NO | 0.85 | 0.90 | 0.95 | 0.98 | 0.95 | 0.90 | 0.90 | 0.95 |
| Properties: | | | | | | | | |
| Content of metal sulfonate group (equivalent/$10^6$ g) | 378 | 365 | 176 | 190 | 281 | 77 | 3.9 | 0 |
| Molecular weight | 18000 | 28000 | 37000 | 45000 | 35000 | 3000 | 3000 | 4000 |

[Remark]:
*Reference examples

EXAMPLES 1 TO 9 AND REFERENCE EXAMPLES 1 TO 2

Fine particles of $CrO_2$ (250 parts), dioctyl sodium-sulfosuccinate (2 parts), polyester (A) (48 parts) and cellosolve acetate (600 parts) were mixed with a ball mill for about 24 hours. To the mixture (400 parts) were added polyester (A) (350 parts) and methyl ethyl ketone (1000 parts), and the mixture was mixed with a ball mill for about 70 hours. The resulting mixture was filtered and defoamed, and thereafter, was applied to a film of a polyethylene terephthalate (thickness: 25μ) with a doctor blade (gap: 30μ). The coated film was allowed to stand in a parallel magnetic field of 1000 oersteds for about one second. The resultant was then allowed to stand in a hot-air drier of 80° C. for three days to remove the solvent to give a film having a smooth, magnetizable layer (thickness: 6μ) which had a Br/Bm ratio of 0.87 and voids of 0.28.

In the same manner as described above except that the polyesters and a vinyl chloride-vinyl acetate copolymer as shown in Table 5 were used in stead of the polyester (A), a magnetizable layer was formed on a film of polyethylene terephthalate. The properties of each magnetizable layer are shown in Table 5.

about 24 hours. To the mixture was added a solution of polyester (A) (40 parts) and isocyanate compound (Desmodul L, made by Bayer, 15 parts) which were homogeneously dissolved in a mixed solvent of methyl ethyl ketone (80 parts), toluene (40 parts), methyl isobutyl ketone (15 parts) and n-butyl alcohol (20 parts). The mixture was again mixed with a ball mill for about 70 hours. The resulting mixture was filtered and defoamed, and then applied to a film of a polyethylene terephthalate (thickness: 25μ) with a doctor blade (gap: 30μ). The coated film was allowed to stand in a parallel magnetic field of 1000 oersteds for about one second. The resultant was then allowed to stand in a hot-air drier of 80° C. for about 10 minutes to remove the solvent and further allowed to stand in an air bath having a constant temperature of 60° C. for two days in order to cure sufficiently and magnetizable layer. The magnetizable layer thus formed had a thickness of 5.7μ, a Br/Bm ratio of 0.89 and voids of 0.25.

In the same manner as described above except that various polyesters as shown in Table 6 were used and the amount of Desmodul L was varied, a magnetizable layer was formed on a film of a polyethylene terephthalate. The properties of the each magnetizable layer are shown in Table 6.

Table 5

| Ex. No. | Polyester | Metal sulfonate group (equivalent/$10^6$ g) | Properties of the magnetizable layer | | |
|---|---|---|---|---|---|
| | | | Br/Bm | Voids | Smoothness |
| Ex. 1 | A | 110 | 0.87 | 0.28 | Excellent |
| Ex. 2 | B | 95 | 0.85 | 0.29 | " |
| Ex. 3 | C | 146 | 0.86 | 0.25 | " |
| Ex. 4 | D | 67 | 0.83 | 0.32 | " |
| Ex. 5 | E | 87 | 0.85 | 0.30 | " |
| Ex. 6 | F | 160 | 0.83 | 0.29 | " |
| Ex. 7 | G | 75 | 0.84 | 0.28 | " |
| Ex. 8 | H | 48 | 0.81 | 0.35 | " |
| Ex. 9 | I | 120 | 0.82 | 0.32 | " |
| Ref. Ex. 1 | J | 0 | 0.80 | 0.41 | Good |
| Ref. Ex. 2 | K* | 0 | 0.60 | 0.45 | Bad |

*Vinyl chloride-vinyl acetate copolymer (VAGH, made by Union Carbide Corp.)

EXAMPLES 10 TO 13 AND REFERENCE EXAMPLES 3 TO 4

Fine particles of γ-$Fe_2O_3$ (60 parts), dioctyl sodium-sulfosuccinate (1 part), silicone oil (1 part), methyl ethyl ketone (10 parts), toluene (20 parts), and methyl isobutyl ketone (15 parts) were mixed with a ball mill for Table 6

| Ex. No. | Polyester | Desmodul L | Metal sulfonate group (equivalent/$10^6$ g) | Properties of the magnetizable layer | | |
|---|---|---|---|---|---|---|
| | | | | Br/Bm | Voids | Smoothness |
| Ex. 10 | A | 15 | 86 | 0.89 | 0.25 | Excellent |
| Ex. 11 | C | 10 | 123 | 0.90 | 0.24 | " |
| Ex. 12 | A | 20 | 80 | 0.87 | 0.25 | " |
| Ex. 13 | C | 12 | 119 | 0.89 | 0.22 | " |
| Ref. Ex. 3 | J | 15 | 0 | 0.83 | 0.43 | " |
| Ref. Ec. 4 | J | 10 | 0 | 0.82 | 0.42 | " |

EXAMPLES 14 TO 17 AND REFERENCE EXAMPLES 5 TO 6

Fine particles of $\gamma\text{-Fe}_2\text{O}_3$ (80 parts), dilauryl succinate (1 part), silicone oil (1 part), methyl ethyl ketone (15 parts), toluene (25 parts) and methy isobutyl ketone (20 parts) were mixed with a ball mill for 24 hours. To the mixture was added a solution of polyester (N) (40 parts) and isocyanate compound (Desmodul L, made by Bayer, 12 parts) which were homogeneously dissolved in a mixed solvent of methyl ethyl ketone (80 parts), toluene (40 parts), methyl isobutyl ketone (15 parts) and butylcellosolve acetate (20 parts). The mixture was again mixed with a ball mill for about 70 hours. The resulting mixture was filtered and defoamed, and then, applied to a film of a polyethylene terephthalate (thickness: $25\mu$) with a doctor blade (gap: $30\mu$) and the resulting coated film was allowed to stand in a parallel magnetic field of 1000 oersteds for about one second. The resultant was allowed to stand in a hot-air drier of 80° C. for about 10 minutes to remove the solvent and further allowed to stand in an air bath having a constant temperature of 60° C. for two days in order to cure sufficiently the magnetizable layer. The smooth magnetizable layer thus obtained had a thickness of $6.0\mu$, a Br/Bm ratio of 0.90 and voids of 0.24.

In the same manner as described above, a magnetizable layer was formed onto a film of a polyethylene terephthalate using polyester (N) and (J) or VAGH shown in Table 7. The properties of each magnetizable layer are shown in Table 7.

Table 7

| | Example No. | | | | Reference Example No. | |
|---|---|---|---|---|---|---|
| | 14 | 15 | 16 | 17 | 5 | 6 |
| Polyester (N) | 40 | 30 | 20 | 30 | | |
| Polyester (J)*1 | | 10 | 20 | | 40 | |
| VAGH*2 | | | | 10 | | 40 |
| Desmodul L | 12 | 12 | 12 | 12 | 12 | 12 |
| Metal sulfonate group (equivalent/$10^6$ g) | 96 | 91 | 81 | 91 | 0 | 0 |
| Br/Bm | 0.90 | 0.87 | 0.82 | 0.84 | 0.78 | 0.58 |
| Voids | 0.24 | 0.31 | 0.35 | 0.32 | 0.45 | 0.48 |
| Smoothness | Excellent | Excellent | Excellent | Excellent | Excellent | Bad |

[Remarks]:
*1Polyester outside the present invention
*2Vinyl chloride-vinyl acetate copolymer (made by Union Carbide Corp.)

EXAMPLES 18 TO 21 AND REFERENCE EXAMPLES 7 TO 11

Fine particles of $\gamma\text{-Fe}_2\text{O}_3$ (60 parts), dilauryl succinate (1 part), silicone oil (1 part), methyl ethyl ketone (15 parts), toluene (25 parts) and methyl isobutyl ketone (15 parts) were mixed with a ball mill for 24 hours. To the mixture was added a solution of polyester (M) (15 parts), vinyl chloride-vinyl acetate copolymer resin (VAGH, made by Union Carbide Corp., 25 parts) and an isocyanate compound (Desmodul L, made by Bayer, 8 parts) which were homogeneously dissolved in a mixed solvent of tetrahydrofuran (30 parts), toluene (30 parts), methyl isobutyl ketone (10 parts) and cellosolve acetate (15 parts). The mixture was again mixed with a ball mill for about 60 hours. The resulting mixture was filtered and defoamed, and then, applied to a film of a polyethylene terephthalate (thickness: $25\mu$) with a doctor blade (gap: $30\mu$). The resulting coated film was allowed to stand in a parallel magnetic field of 1000 oersteds for about one second. The resultant was allowed to stand in a hot-air drier of 80° C. for about 30 minutes to remove the solvent and further allowed to stand in an air bath having a constant temperature of 60° C. for 7 days in order to cure sufficiently the magnetizable layer. The smooth magnetizable layer thus obtained had a thickness of $6.3\mu$, a Br/Bm ratio of 0.81 and voids of 0.36.

In the same manner as described above except that the polyesters and other thermoplastic or thermosetting resins as shown in Table 8 were used, a magnetizable layer was formed on a film of a polyethylene terephthalate. The properties of each magnetizable layer are shown in Table 8.

Table 8

| | | Example No. | | | | Reference Example No. | | | | |
|---|---|---|---|---|---|---|---|---|---|---|
| | | 18 | 19 | 20 | 21 | 7 | 8 | 9 | 10 | 11 |
| Polyester | (M) | 15 | | | | | | | | |
| " | (N) | | 10 | | | | | | | |
| " | (O) | | | 8 | | | | | | |
| " | (P) | | | | 5 | | | | | |
| " | (Q)*1 | | | | | 40 | | | | |
| " | (R)*1 | | | | 35 | | 40 | | | |
| Vinyl chloride-vinyl acetate copolymer*2 | | 25 | | | | | | 40 | | |
| Polyurethane resin*3 | | | 30 | | | | | | 40 | |
| Acrylonitrile-vinylidene chloride copolymer*4 | | | | 32 | | | | | | 40 |
| Desmodul L | | 8 | | | 10 | 8 | 8 | | | |
| Metal sulfonate group (equivalent/$10^6$ g) | | 132 | 147 | 155 | 145 | 0 | 0 | 0 | 0 | 0 |
| Br/Bm | | 0.81 | 0.87 | 0.80 | 0.86 | 0.74 | 0.80 | 0.65 | 0.78 | 0.63 |
| Voids | | 0.36 | 0.31 | 0.36 | 0.30 | 0.42 | 0.40 | 0.44 | 0.43 | 0.45 |
| Smoothness | | Excellent | Excellent | Excellent | Excellent | Bad | Good | Good | Good | Bad |

[Remarks]:
*1Polyesters outside the present invention
*2Tradename: VAGH (made by Union Carbide Corp.)
*3A reaction product of an ethylene glycol-adipic acid type polyester polyol and diphenylmethane-diisocyanate (molecular weight: 30,000)
*4Tradename: Sarane F-310 (made by Asahi Dow)

EXAMPLES 22 TO 27 AND REFERENCE EXAMPLES 12 TO 14

Fine particles of $CrO_2$ (80 parts), dilauryl succinate (1 part), silicone oil (1 part), methyl ethyl ketone (70 parts) and cellosolve acetate (20 parts) were mixed with a ball mill for about 24 hours. To the mixture were added a solution of polyurethane (I) (solid content: 33% by weight, 120 parts) and an isocyanate compound (Desmodul L, made by Bayer, 10 parts), and the mixture was again mixed with a ball mill for 60 hours. The resulting mixture was filtered and defoamed and then, applied to a film of a polyethylene terephthalate (thickness: $25\mu$) with a doctor blade (gap: $25\mu$). The resulting coated film was allowed to stand in a parallel magnetic field of 1000 oersteds for about one second. The resultant was then allowed to stand in a hot-air drier of 80° C. for about one hour to remove the solvent and thereafter allowed to stand in an air bath having a constant temperature of 60° C. for 7 days in order to cure sufficiently the magnetizable layer. The smooth magnetizable layer thus obtained had a thickness of $5.8\mu$, a Br/Bm ratio of 0.86 and voids of 0.28.

In the same manner as described above except that various polyurethanes as shown in Table 9 were used, a magnetizable layer was formed on a film of a polyethylene terephthalate. The properties of each magnetizable layer are shown in Table 9.

Table 9

|  | Example No. |  |  |  |  |  | Reference Example No. |  |  |
|---|---|---|---|---|---|---|---|---|---|
|  | 22 | 23 | 24 | 25 | 26 | 27 | 12 | 13 | 14 |
| Polyurethane | I | II | III | IV | V | VI | VII | VIII | VIII |
| Desmodul L | 10 | 15 | 0 | 0 | 10 | 8 | 10 | 0 | 10 |
| Metal sulfonate group (equivalent/$10^6$ g) | 318 | 285 | 0 | 0 | 237 | 67 | 3.3 | 0 | 0 |
| Br/Bm | 0.86 | 0.88 | 0.89 | 0.89 | 0.86 | 0.85 | 0.80 | 0.78 | 0.79 |
| Voids | 0.28 | 0.27 | 0.25 | 0.26 | 0.30 | 0.32 | 0.40 | 0.43 | 0.42 |
| Smoothness | Excellent | Excellent | Excellent | Excellent | Excellent | Excellent | Excellent | Good | Good |

EXAMPLES 28 TO 31 AND REFERENCE EXAMPLES 15 TO 19

Fine particles of $\gamma$-$Fe_2O_3$ (120 parts), dilauryl succinate (1.5 part), silicone oil (1 part), methyl ethyl ketone (90 parts) and cellosolve acetate (30 parts) were mixed with a ball mill for about 24 hours. To the mixture were added a polyurethane (I) solution (solid content: 33% by weight, 60 parts), a solution of a thermoplastic polyester resin (Vylon 200, made by Toyo Boseki K.K.) in a mixed solvent of methyl ethyl ketone and toluene (1:1 by weight) (solid content: 33% by weight, 60 parts), and an isocyanate compound (Desmodul L, made by Bayer, 10 parts), and the mixture was again mixed with a ball mill for 60 hours. The resulting mixture was filtered and defoamed, and then, applied to a film of a polyethylene terephthalate (thickness: $25\mu$) with a doctor blade (gap: $25\mu$). The resulting coated film was allowed to stand in a parallel magnetic field of 1000 oersteds for about one second. The resultant was allowed to stand in a hot-air drier of 80° C. for about one hour to remove the solvent and then allowed to stand in an air bath having a constant temperature of 60° C. for 7 days in order to cure sufficiently the magnetizable layer. The magnetizable layer thus obtained had a thickness of $6\mu$, a Br/Bm ratio of 0.88 and voids of 0.29.

In the same manner as described above except that various polyurethanes as shown in Table 10 were used, a magnetizable layer was formed onto a film of a polyethylene terephthalate. The properties of each magnetizable layer are shown in Table 10.

Table 10

|  | Example No. |  |  |  | Reference Example No. |  |  |  |  |
|---|---|---|---|---|---|---|---|---|---|
|  | 28 | 29 | 30 | 31 | 15 | 16 | 17 | 18 | 19 |
| Polyurethane (I) solution[*1] | 60 |  | 40 |  |  |  |  |  |  |
| Polyurethane (II) solution[*1] |  | 90 |  | 60 |  |  |  |  |  |
| Polyester solution[*2] | 60 |  |  |  | 100 |  |  | 100 |  |
| Vinyl chloride-vinyl[*3] acetate copolymer soln. |  | 30 |  |  |  | 100 |  |  | 100 |
| Polyurethane (VIII) solution[*4] |  |  | 80 | 60 |  |  | 100 |  |  |
| Desmodul L | 10 |  | 10 |  |  |  |  | 10 | 10 |
| Metal sulfonate group (equivalent/$10^6$) | 159 | 274 | 106 | 183 | 0 | 0 | 0 | 0 | 0 |
| Br/Bm | 0.88 | 0.85 | 0.87 | 0.88 | 0.82 | 0.58 | 0.81 | 0.83 | 0.59 |
| Voids | 0.29 | 0.33 | 0.29 | 0.28 | 0.43 | 0.48 | 0.40 | 0.42 | 0.47 |
| Smoothness | Excellent | Excellent | Excellent | Excellent | Good | Bad | Good | Good | Bad |

[Remarks]:
[*1] Solid content: 33 % by weight
[*2] A solution of Vylon 200 (made by Toyo Boseki K.K.) in a mixed solvent of methyl ethyl ketone and toluene (1 : 1 by weight) (solid content: 33 % by weight)
[*3] A solution of VAGH (made by Union Carbide Corp.) in a mixed solvent of methyl ethyl ketone and toluene (1 : 1 by weight) (solid content: 33 % by weight)
[*4] Solid content: 33 % by weight

What is claimed is:

1. A magnetic recording medium having a magnetizable layer of fine magnetic particles which are dispersed in a binder selected from the group consisting of a polyester and polyurethane having a metal sulfonate group of 10 to 1000 equivalents/$10^6$ g of the polymer.

2. A magnetic recording medium according to claim 1, wherein the binder is a polyester having a reduced viscosity of 0.2 or more which is copolymerized with a dicarboxylic acid component having a metal sulfonate group of 0.3 to 7.0% by mol based on the total carboxylic acid components.

3. A magnetic recording medium according to claim 2, wherein the polyester having a reduced viscosity of 0.2 or more has a metal sulfonate group of 20 to 300 equivalents/$10^6$ g of the polyester.

4. A magnetic recording medium according to claim 1, wherein the binder is a mixture of a polyester having a reduced viscosity of less than 0.2 which is copolymerized with a dicarboxylic acid component having a metal sulfonate group of at least 0.5% by mol based on the total carboxylic acid components and other thermoplastic and/or thermosetting resin.

5. A magnetic recording medium according to claim 4, wherein the polyester having a reduced viscosity of less than 0.2 has a metal sulfonate group of 20 to 500 equivalents/$10^6$ g of the polyester.

6. A magnetic recording medium according to claim 1, wherein the binder is a polyurethane having a metal sulfonate group of 20 to 400 equivalents/$10^6$ g of the polyurethane.

7. A magnetic recording medium according to claim 6, wherein the polyurethane is prepared by reacting a polyester polyol having a metal sulfonate group and a polyisocyanate.

8. A magnetic recording medium according to claim 1, wherein the polyester and polyurethane contain a dicarboxylic acid component having an alkali metal sulfonate group selected from the group consisting of alkali metal salts of 4-sulfophthalic acid, 5-sulfoisophthalic acid, sulfoterephthalic acid, 4-sulfonaphthalene-2,7-dicarboxylic acid, 5-(4-sulfophenoxy)isophthalic acid, and 5-(4-sulphenoxy)terephthalic acid.

9. A magnetic recording medium according to claim 8, wherein the dicarboxylic acid component having an alkali metal sulfonate group is a member selected from the group consisting of 5-sodium sulfoisophthalic acid, 5-potassium sulfoisophthalic acid, sodium sulfoterephthalic acid, and potassium sulfoterephthalic acid.

10. A magnetic recording medium according to claim 1, wherein an isocyanate compound is incorporated into the binder.

11. A magnetic recording medium according to claim 1, wherein both the polyester having a metal sulfonate group and the polyurethane having a metal sulfonate group are used together as the binder.

12. A magnetic recording medium according to claim 1 or 11, wherein a vinyl chloride-vinyl acetate copolymer is incorporated into the binder.

* * * * *